United States Patent
Allan et al.

(10) Patent No.: US 7,463,584 B2
(45) Date of Patent: Dec. 9, 2008

(54) SYSTEM AND METHOD FOR HUB AND SPOKE VIRTUAL PRIVATE NETWORK

(75) Inventors: David Allan, Ottawa (CA); Nigel Bragg, Weston Colville (GB); Liam Casey, Ottawa (CA); Jerome Chiabaut, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 744 days.

(21) Appl. No.: 10/910,685

(22) Filed: Aug. 3, 2004

(65) Prior Publication Data

US 2006/0029032 A1    Feb. 9, 2006

(51) Int. Cl.
    *G01R 31/08*    (2006.01)
(52) U.S. Cl. ............................ 370/234; 370/401
(58) Field of Classification Search ............. None
     See application file for complete search history.

(56) References Cited

U.S. PATENT DOCUMENTS

| | | | |
|---|---|---|---|
| 6,973,033 B1 * | 12/2005 | Chiu et al. | 370/230.1 |
| 6,985,488 B2 * | 1/2006 | Pan et al. | 370/395.3 |
| 7,082,102 B1 * | 7/2006 | Wright | 370/229 |
| 2002/0114274 A1 * | 8/2002 | Sturges et al. | 370/229 |
| 2004/0233909 A1 * | 11/2004 | Allen et al. | 370/395.1 |

OTHER PUBLICATIONS

Request for Comments 2547; Network Working Group, E. Rosen, Y. Rekhter, Cisco Systems, Inc.; Mar. 1999, *BGP/MPLS VPNs*.

* cited by examiner

*Primary Examiner*—Chau Nguyen
*Assistant Examiner*—Eunsook Choi
(74) *Attorney, Agent, or Firm*—Christopher & Weisberg, P.A.

(57) ABSTRACT

A method and system for providing a virtual private communication network to transport customer data between a set of customer devices coupled to a provider network. A committed information rate is advertised to a provider tandem. The provider tandem determines whether sufficient network resources exist to successfully transport to a destination customer device all offered data from the set of customer devices.

21 Claims, 5 Drawing Sheets

SYSTEM AND METHOD FOR HUB AND SPOKE VIRTUAL PRIVATE NETWORK

BACKGROUND OF THE INVENTION

1. Statement of the Technical Field

The present invention relates to the field of virtual private networking and more particularly to a method and system for allowing an engineered virtual private networking solution through the use of a tandem routing device as a virtual hub in a logical hub and spoke network topology.

2. Description of the Related Art

A virtual private network ("VPN") allows a subscriber to use a shared networking infrastructure to provide access among the subscriber's networked devices in a manner which preserves the security and integrity of the data transmitted between the networked devices. In other words, a VPN provide remote offices or individual users for a subscribing entity with secure access to their organization's network, even though the underlying transport network is shared by many organizations. Privacy is maintained via security procedures and tunneling protocols. In effect, the tunneling protocols encapsulate data at the sending end and decapsulate it at the receiving end, send the data through a "tunnel" that cannot be "entered" by data that is not properly encapsulated. The data packets are received at a provider network entry point at a provider edge ("PE") device, encapsulated and routed through the service provider's network and decapsulated at a far end PE device. The PE's send and receive data to/from customer edge ("CE") devices such as customer routers. CE devices provide access to/from customer networks and devices. In essence, the provider network acts as the network cloud used to transport data from CE device to CE device.

While simple in principle, VPN service providers face myriad problems when trying to implement and support customer VPNs, particularly in the area of designing the network to meet the committed information rate ("CIR") typically guaranteed to subscribers. CIR is a bandwidth, typically expressed in bits per second, associated with a logical connection between CE devices and/or access to the provider network such that the service provider provides some level of assurance that data delivered to the PE at or below the CIR will actually be accepted by the PE. Subscribers are typically allowed to send traffic at a rate above the CIR, but without any assurance that such data will be accepted and or delivered to the destination CE device.

Current transmission control protocol/internet protocol ("TCP/IP")-based VPNs suffer from a number of drawbacks which lead to inefficient and expensive implementations. This typically results from the inability of service providers to engineer the underlying network supporting the VPNs. Standards such as Request for Comment ("RFC") 2547 attempt to set grounds rules for the provisioning of VPNs to allow subscribers to outsource their network backbone services to service providers. For example, RFC 2547, the entirety of which is incorporated by reference herein, sets out a method, elements and functions under which a service provider can use a TCP/IP backbone network to provide VPN services. RFC 2547 describes an arrangement under which an exterior gateway protocol, such as the border gateway protocol ("BGP") is used to distribute routes throughout the backbone network and multiprotocol label switching ("MPLS") is used to forward the customer's data packets across the backbone.

RFC 2547-based implementations take a many-many approach and use BGP flooding to obtain a linear provisioning model at the service layer (of the open systems interconnection ("OSI") model). RFC 2547-based implementations replicate the route table and forwarding table to create a virtual mesh of the CE devices and depend on an underlying connectionless network to provide a logical mesh of the PE devices. The use of a connectionless "cloud" to mesh the PE devices that is completely decoupled from the contracted service connecting CE devices is inefficient, can lead to outages and over-building of the backbone network because the operation of the underlying connectionless cloud is completely decoupled from the contract load (amount of customer data) or adds moves and changes to customer sites or customer behavior. With current RFC 2547-based implementations, the impact of customer behavior on network loading is not constrained and changes in customer behavior or addition of new customers can have unexpected effects on overall network performance. The present mode of operation for RFC 2547 based networks is purely reactive. Service providers watch traffic and utilization reports, then react to link oversubscription or underutilization by fiddling with routes, adding/deleting logical bandwidth from the links between PE devices and/or adding physical capacity to the backbone network. This is not necessarily coupled to customer change requests and therefore may not have any associated revenue as it merely may be a change in customer traffic patterns that are within contractual boundaries. It is desirable to have a backbone design and provisioning method and resultant service provider backbone network in which capacity is added as needed instead of adding too much capacity when not needed or once service problems have manifested themselves. A deterministic coupling between backbone engineering/capacity and customer adds, moves and changes is very desirable.

Service provider implementations, such as those described above with respect to RFC 2547, may be defined as point-to-cloud networks. These implementations disadvantageously (1) route traffic down the shortest weighted path and require the manual manipulation of routing algorithms to optimize network traffic distributions, (2) require operators to deal with "slosh", i.e. bursty subscriber traffic which can result in insufficient bandwidth or too much bandwidth and (3) require engineered over-subscription (exacerbates "slosh" vulnerability to changes in subscriber behavior). In addition, trying to offer/manage a quality of service ("QoS") feature as part of the service provider offering for a full mesh backbone is prohibitively expensive in terms of the signaling requirements and/or the amount of backbone bandwidth which must be made available.

It is therefore desirable to have a method and system to provide a VPN backbone which offers a simple topology and which is engineered such that capacity can be added as needed and which is deterministic such that service providers can easily and accurately determine what the backbone should look like in response to the provisioning of services, easily measure the quality of the service they offer and have appropriate coupling between services and inventory. It is further desirable to have a method and system in which artifacts of individual VPN's operational behavior such as the impact of moves, adds and changes, seamlessly integrates into service provider network operations and does not have undesirable downstream effects while constraining the effect of subsequent changes in customer behavior.

In addition, because backward compatibility is typically a concern of service providers as they move to implement and integrate newer technologies, it is desirable to have a system and method which is compatible with existing implementations, such as those based on RFC 2547.

SUMMARY OF THE INVENTION

The present invention addresses the deficiencies of the art in respect to virtual private networks and, in particular, to virtual private networks which are not implemented in a manner which is engineerable and scalable as to allow network characteristics to be deterministic and understandable.

According to an aspect of the present invention, a method for a virtual private communication network to transport customer data between a set of customer devices coupled to a provider network is provided in which a committed information rate is advertised to a provider tandem. The provider tandem determines whether sufficient network resources exist to successfully transport to a destination customer device all offered data from the set of customer devices.

According to another aspect of the present invention, a system for a virtual private communication network to transport customer data is provided which includes a set of customer devices, a set of provider edge devices and a provider tandem. Each of the set of provider edge devices advertises a committed information rate for at least one of a corresponding customer device from the set of customer devices. The provider tandem is in data communication with the set of provider edge devices. The provider tandem determines whether sufficient network resources exist to successfully transport to a destination customer device all offered data from the set of customer devices.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

Figure 1:
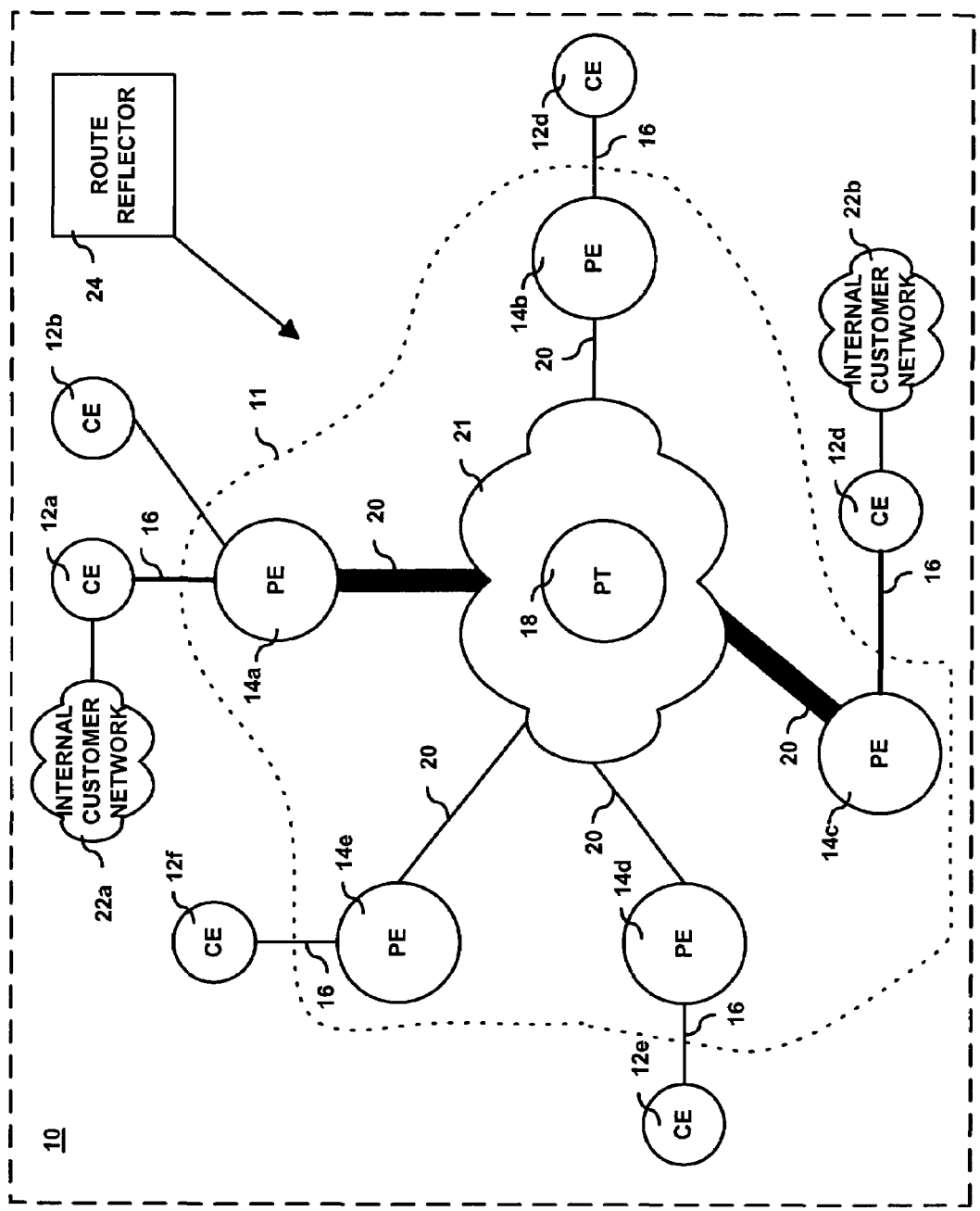
FIG. 1 is a diagram of a system constructed in accordance with the principles of the present invention.

Initially, it is noted that the term "CIR" as used herein is defined to mean an indication of a contracted load for which the provisioning system explicitly allocates resources. Referring now to the drawing figures in which like reference designators refer to like elements, there is shown in FIG. 1 a diagram of a system constructed in accordance with the principles of the present invention and referred to generally as '10'. System 10 includes customer edge devices 12a-12f (referred collectively hereto as customer edge device 12) coupled to provider network 11, more specifically to provider edge devices 14a-14e (referred collectively hereto as provider edge device 14) via data communication link 16. Although not shown, it is contemplated that a customer edge device 12 can be linked to multiple provider edge devices 14 via multiple data communication links 16.

Customer edge devices 12 can be any routing and/or switching device as may be known in the art capable of supporting a VPN modified in accordance with the features and functions described herein. Likewise, provider edge device 14 can be any routing and/or switching device used by those of ordinary skill in the art to implement a virtual private network modified in accordance with the features and functions described herein in accordance with the present invention. By way of non-limiting example, a customer edge device ("CE") 12 and provider edge device ("PE") 14 may include suitable input and output interfaces, microprocessors, storage and operating systems to support the features and functions described herein.

Data communication link 16 can be any digital data communication facility, whether wired or wireless, capable of facilitating digital transmission from customer edge device 12 to provider edge device 14. Such links are preferably capable of transmitting TCP/IP data as may be known in the art.

System 10 also includes provider tandem ("PT") 18 linked to one or more provider edge devices 14 via data communication link 20 and other network elements which are part of provider network 11. For the sake of simplicity and ease of understanding of the present invention, these other network elements are depicted by network element cloud 21. Accordingly provider network 11 includes provider edge devices 14, provider tandem 18, data communication links 20 and the remainder of network elements included as part of network element cloud 21. It is presumed that one of ordinary skill in the art would understand that the devices within network element cloud 21, other than provider tandem 18, provide no enhanced service functionality in conjunction with the present invention and serve merely to route data from provider edge devices 14 to provider tandem 18 and vice versa as is known in the art.

Of note, although PT 18 is shown as a separate element from PE 14, the functionality of PT 18 can be located within and provided by any suitable network element in provider network 11. For example, is contemplated that the functionality provided by PT 18 can be implemented as part of PE 14. Put another way, it is contemplated that the software providing the provider tandem functionality described in detail below can be implemented on the same platform as a provider edge device 14. The devices are shown separately in FIG. 1 merely for ease of explanation. In addition, although multiple CEs 12 are shown in FIG. 1, it is contemplated that, as with traditional virtual private networks, CEs 12 can be supporting different customers and sharing the backbone network shown by PEs 14 and communication links 20. However, it is contemplated that each customer will be supported by a separate logical instance of PT 18. For scalability reasons, it is preferable to implement multiple instances of PT 18 co-located in a single network element.

Also as shown in FIG. 1, system 10 includes internal customer networks 22a and 22b (referred to collectively herein as internal customer networks 22). Internal customer networks 22 represent those devices which use the virtual private network formed by the other elements shown in FIG. 1 for communication between sites. For example, the internal customer network 22a may contain a personal computer which requires data communication with a server within internal customer network 22b. Of course, the system shown by FIG. 1 is not limited solely to communications between a personal computer and a server. It is contemplated that any arrangement by which one customer device is in communication with another customer device across the virtual private network can be supported, including but not limited to multimedia, voice, and other applications. As such, the word "data" as used herein refers to any digitized customer information.

System 10 also includes a route reflector such as a border gateway protocol ("BGP") route reflector. Route reflectors such as a BGP route reflector are known in the art and are used to propagate routing information among the devices in the network such as between customer edge devices 12, provider edge devices 14 and provider tandem 18. This is an example of a specific embodiment of a function that meets the general requirement of flooding service information to those network elements that participate in implementing a specific service instance. For example, it is contemplated that route propagation can be achieved via a full mesh of BGP adjacencies between all provider tandems 18 and all provider edge devices 14.

Provider edge devices 14 are typically co-located with or are located near a customer edge device 12 that it is supporting. For example, referring to FIG. 1, provider edge device 14a provides access to the backbone of the virtual private network supported by the service provider for customer edge devices 12a and 12b. As such, a provider edge device 14 includes a physical attachment circuit to customer edge device 12 such as a physical data communication link 16. As is discussed below, part of the provisioning process of adding a new customer site onto the virtual private network includes provisioning the provider edge device 14 to identify the virtual private network for the customer being added, providing the physical interface to the virtual private network provider backbone and configuring the provider edge device to identify the committed information rate ("CIR") and other service specifics for communication between the customer edge device 12 and provider tandem 18.

Although FIG. 1 shows a number of provider edge devices 14, these are shown merely to illustrate the type of provider network that can be built to support multiple customers, it being understood that a single provider tandem, whether physical or as a software instance, supports a particular customer. For example, data communication between internal customer network 22a and a device within internal customer network 22b would flow from internal customer network 22a to customer edge device 12a then logically to tandem 18 (via, for example, provider edge device 14a and other network elements within network element cloud 21) to provider edge device 14c through customer edge device 12b to internal customer network 22b. In other words, communication between internal customer network 22a and internal customer network 22b via an entry customer edge device 12a and destination customer entry device 12d as a direct logical hub and spoke topology in which customer edge device 12a communicates with customer edge device 12d via provider tandem 18 through, for example, the communication links 20 and data communication links 16 shown in bold in FIG. 1.

Figure 2:
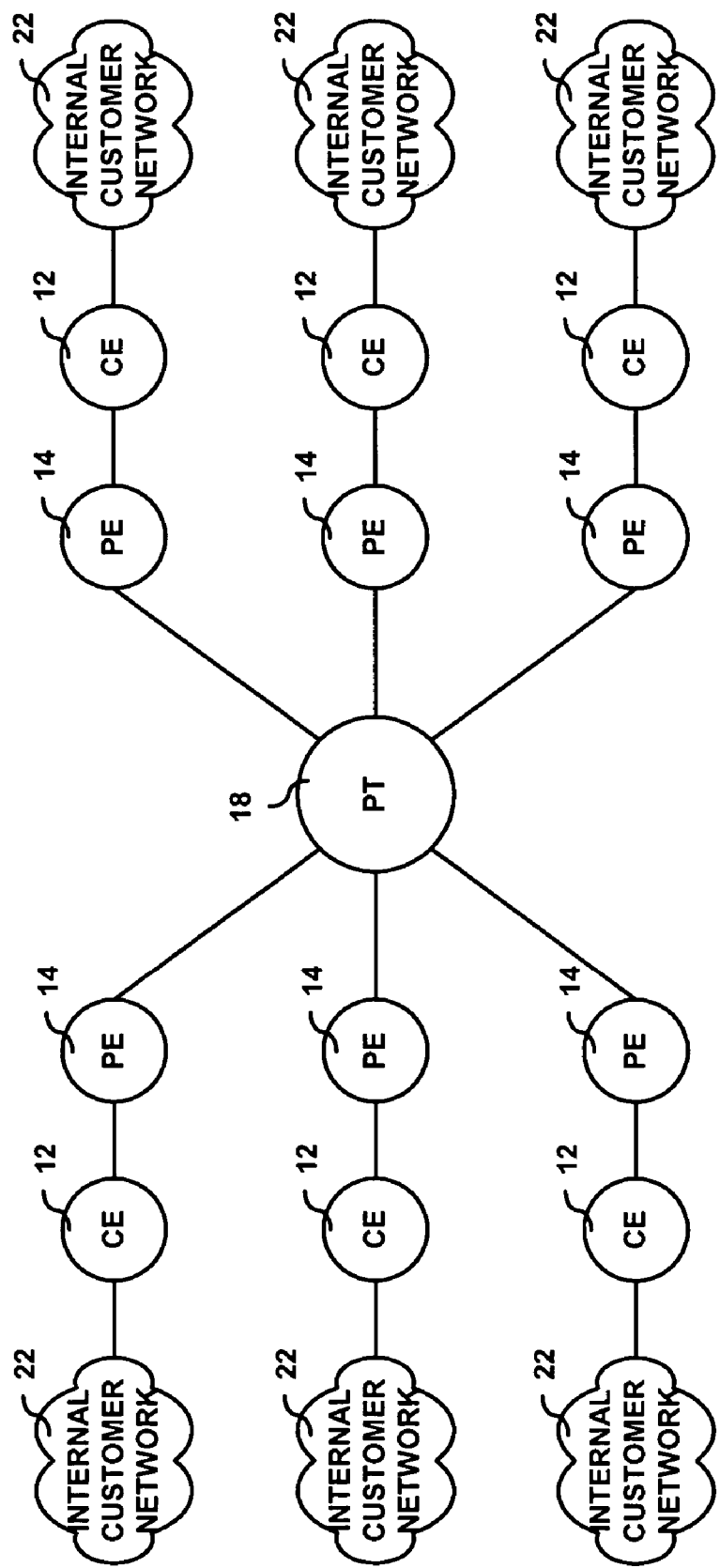
FIG. 2 is a diagram of the hub and spoke arrangement of the present invention.

FIG. 2 shows a simplified version of the hub and spoke arrangement of the present invention in which a number of internal customer networks 22 are logically connected to one another via the hub and spoke network formed by customer edge devices 12, provider edge devices 14 and provider tandem 18. This virtual topology can be overlaid on any packet network that supports packet connections. The hub and spoke design and network topology shown in FIGS. 1 and 2 provide the infrastructure to allow an engineered deterministic service provider backbone to be built to support reliable customer virtual private networks. This infrastructure, in combination with the transmission of the CIR from the provider edge device 14 to the provider tandem device 18 as part of a regular routing update allows provider tandem device 18 to determine whether there is sufficient bandwidth on the downstream link to the destination customer edge device to reliably transport the customer data. As such, the CIR can be sent as an extension within the routing protocol, for example, as a BGP extension. Sending the CIR from the provider edge device 14 to the provider tandem 18 as part of a BGP extension provides a number of advantages such as a reliable mechanism for transmitting CIR information throughout the network and implementation within existing physical networks is as a software upgrade. For example, because it is contemplated that the CIR information is advertised as a BGP extension, existing networks such as those based on RFC 2547 built around multi-protocol label switching ("MPLS") and BGP can be modified to achieve the advantages of the present invention by providing the software and/or physical devices needed to support the functions of provider tandem 18, described herein, and include the CIR as part of BGP route distribution as a BGP extension.

In accordance with the principles of the invention shown in FIGS. 1 and 2, customer data can be transported from a first customer edge device, such as customer edge device 12a, to a second customer edge device, such as customer edge device 12d, as follows. As discussed above, both provider edge devices 14a and 14c supporting the customer edge devices advertise their committed information rates to provider tandem 18 as part of a routing update that occurs when these provider edge devices update other devices in the network to indicate which routes are supported by customer edge devices (such as by CE 12a and 12d). Routes supported refers to those routes that are available to customer devices within each respective internal customer network 22.

When the customer data is received at the provider tandem, the provider tandem determines whether sufficient network resources exist to transport the customer data from one customer edge device 12 to the other customer edge device 12. This determination is based on the committed information rate received by provider tandem 18 as part of the normal routing update. For example, referring to FIG. 1, provider tandem 18 would determine whether there is sufficient CIR to transport customer data to customer edge device 12d based on the committed information rate. Provider tandem 18 will mark the customer data it receives to indicate whether the customer data transmission is above the committed information rate, i.e., whether the customer is transmitting the data as a burst of information. This is known as policing and re-marking of traffic and is well understood to those versed in the art.

The above-described arrangement deals with "slosh" by providing a provider network which is engineerable and deterministic based on the use of the committed information rate and point to point trunks. Because the adverse impact of changes in customer traffic patterns and bursts is minimized as the path through the network is constrained to the virtual topology, the customer can be provided with a guaranteed service level. Also, the impact of exceeding the guaranteed service level (CIR) is understandable and can be easily modeled. Because provider tandem 18 is the hub of the customer's VPN traffic, provider tandem 18 can track the statistical information and compare it with trends, other real time trigger points, etc., and alert service provider network operators as to whether additional trunk bandwidth must be provisioned or whether additional bandwidth must be installed. For example, the present invention advantageously provides a mechanism by which spoke link can be provisioned to increase the committed information rate because the band with on that link is easily tracked. Because the topology is a hub and spoke topology, extensive modeling and tweaking of the links on the network is simply not necessary. Similarly such information will also provide triggers for the provider to advise the customer that its contracted service is insufficient to handle the actual customer load.

Advantageously, this single CIR reservation handles the full set of reachable destinations from the customer edge device 12 with allow the reuse of network resources, thereby providing a highly economical means of offering CIR. In addition, the hub and spoke arrangement means that the bandwidth scales linearly based on the number of sites supported. The service provider network elements (such as provider edge device 14 and provider tandem 18) have information to indicate what the committed information rate is for each link regarding whether customer data would be marked and/or dropped. As such, a determination regarding the ability of the provider network to carry the customer data can be made at the front end of routing process. This determination is made well in advance of the undesirable situation that occurs in the prior art where customer data is carried across many links only to be dropped at the last link within the service provider network because that link is oversubscribed. Because provider tandem 18 serves as the hub with access to the hub being via spokes, traffic determinations are made without the need to make the these determinations at the later stages of traffic routing once the customer data packet has traveled through a significant portion of its route. In addition, as is described below, tandem 18 can efficiently manage the quality of service for the trunks and can achieve quality of service requirements via the trunking between provider tandem 18 and provider edge device 14.

Figure 3:
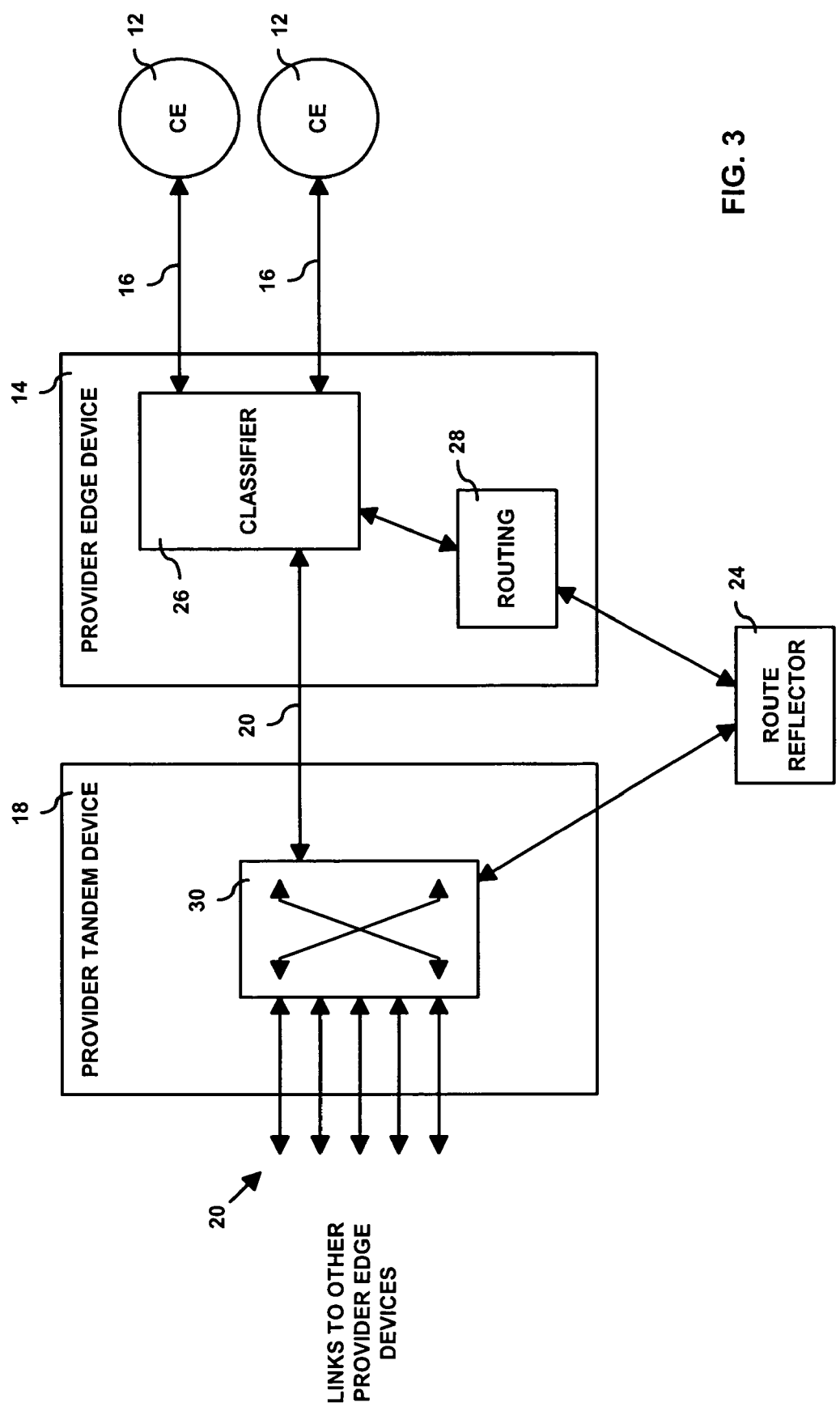
FIG. 3 is a block diagram of a provider edge device and a provider tandem device constructed in accordance with the principles of the present invention.

Provider edge device 14 and provider tandem device 18 are described in more detail with reference to FIG. 3. In particular, a description of how customer data and routing information is provided to other devices in the virtual private network is described with reference to FIG. 3. Provider edge device 14 includes classifier 26 and routing engine 28 whose functionality generally corresponds to that of current RFC 2547 practice. Classifier 26 receives customer traffic from customer edge device 12 and in which the customer data includes a destination address. Classifier 26 maps that destination address to a particular path through the network which is then mapped to a pre-provisioned trunk to the appropriate PT 18.

Advantageously, this single CIR reservation handles the full set of reachable destinations from the customer edge device 12 which allows the reuse of network resources, thereby providing a highly economical means of offering CIR. In addition, the hub and spoke arrangement means that the bandwidth scales linearly based on the number of sites supported. The service provider network elements (such as provider edge device 14 and provider tandem 18) have information to indicate what the committed information rate is for each link regarding whether customer data would be marked and/or dropped. As such, a determination regarding the ability of the provider network to carry the customer data can be made at the front end of routing process. This determination is made well in advance of the undesirable situation that occurs in the prior art where customer data is carried across many links only to be dropped at the last link within the service provider network because that link is oversubscribed. Because provider tandem 18 serves as the hub with access to the hub being via spokes, traffic determinations are made without the need to make the these determinations at the later stages of traffic routing once the customer data packet has traveled through a significant portion of its route. In addition, as is described below, tandem 18 can efficiently manage the quality of service for the trunks and can achieve quality of service requirements via the trunking between provider tandem 18 and provider edge device 14.

Provider tandem device 18 includes map 30, populated by the BGP information from route reflector 24, to map service Label Switched paths ("LSPs") to trunks supported by communication links 20. Advantageously, unlike prior art VPN provider networks in which trunk switching devices such as those which are part of network element cloud 21 use a cross-connect populated by a reservation protocol ("RSVP") or other label distribution protocol ("LDP") implying either an 'n squared' mesh or non-deterministic connectionless behavior, overhead and resource requirements are advantageously reduced by populating a service layer switching map via BGP and configuring a trunked virtual topology via RSVP, CR-LDP or other suitable signaling protocol. This can be done because BGP or the routing protocol implemented as part of a system constructed in accordance with the principles of the present invention includes an extension which employs the CIR requirements. Accordingly, the operation of provider tandem 18 is to terminate the inbound trunk via removal of the trunk label of inbound data, map the inbound service LSP to the appropriate outbound service LSP by swapping the label to correspond to the destination provider edge device 14 and map the customer data to the appropriate PE 14 by pushing the appropriate trunk label onto the customer data to route the packet to the destination provider edge device 14. These procedures are well defined for MPLS label switch routers ("LSRs") as specified in RFC 3031, and it is possible to envision other specific embodiments of provider tandem's 18 MPLS functions. Use of Penultimate Hop Popping may be employed at both the trunk level such that the tandem has no requirement to explicitly pop the trunk label (the operation performed by the network element upstream of it). Provider tandem 18 may also be configured to offer additional labels to its BGP peers to impose additional hierarchy in the forwarding operations and condense the requisite cross-connect table size. There are other embodiments that are a consequence of the richness of functionality specified in MPLS. Suffice it to say that any hierarchical combination of trunk and service labeling that can appropriately transit a provider tandem 18 is sufficient to realize this invention.

Figure 4:
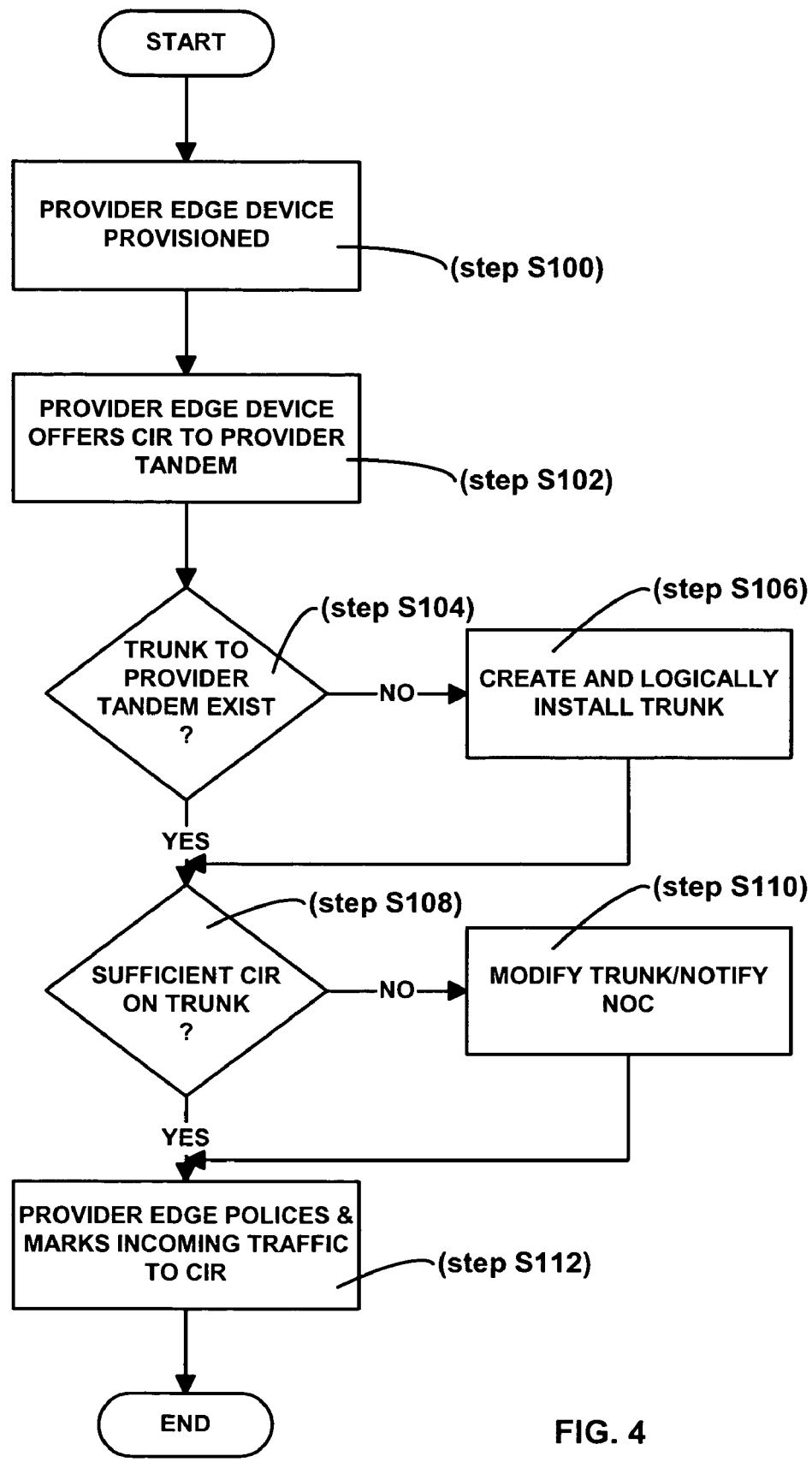
FIG. 4 is a flow chart of the process of adding a customer edge device to a virtual private network constructed in accordance with the principles of the present invention.
Figure 5:
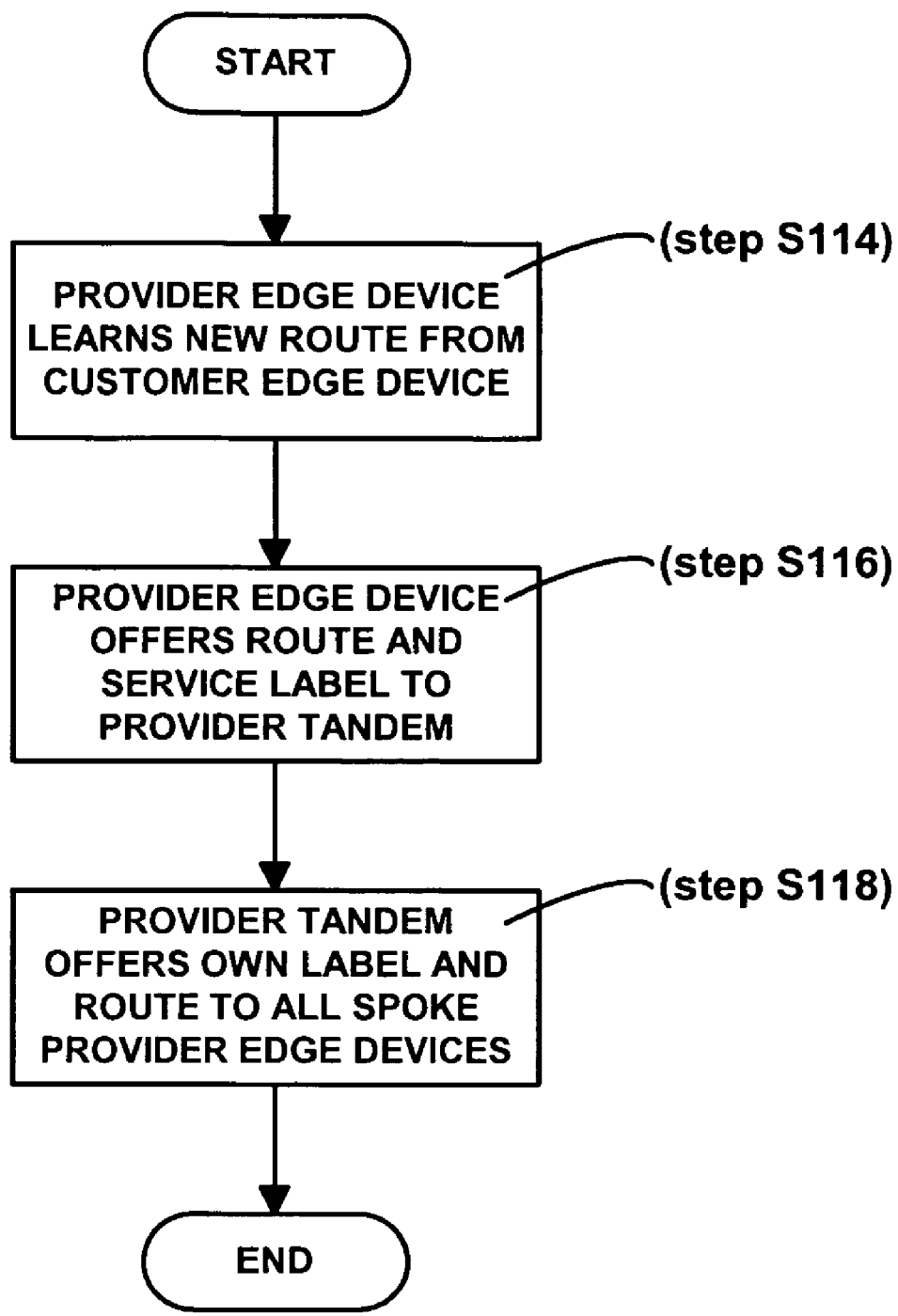
FIG. 5 is a flow chart of the process of adding a new customer route to a system constructed in accordance with the principles of the present invention.

Adding a customer edge device 12 to a virtual private network constructed in accordance with the principles of the present invention is described with reference to FIG. 4. Initially, the provider edge device 14 is provisioned to support the newly added customer edge device 12 (step S100). This provisioning process includes (1) physically linking the customer device, i.e., access circuit, to an input/output port on provider edge device 14, (2) provisioning the virtual private network via the provider edge device 14 to identify the customer edge device 12 as a device within the virtual private network, i.e. assign a site identifier and configure provider edge device 14 so that this information can be distributed throughout the network and (3) establish a CIR for communication between customer edge device 12 and provider tandem 18.

Provider tandem device 18 includes map 30, populated by the BGP information from route reflector 24, to map service label switched paths ("LSPs") to trunks supported by communication links 20. Advantageously, unlike prior art VPN provider networks in which trunk switching devices such as those which are part of network element cloud 21 use a cross-connect populated by a reservation protocol ("RSVP") or other label distribution protocol ("LDP") implying either an 'n squared' mesh or non-deterministic connectionless behavior, overhead and resource requirements are advantageously reduced by populating a service layer switching map via BGP and configuring a trunked virtual topology via RSVP, CR-LDP or other suitable signaling protocol. This can be done because BGP or the routing protocol implemented as part of a system constructed in accordance with the principles of the present invention includes an extension which employs the CIR requirements. Accordingly, the operation of provider tandem 18 is to terminate the inbound trunk via removal of the trunk label of inbound data, map the inbound service LSP to the appropriate outbound service LSP by swapping the label to correspond to the destination provider edge device 14 and map the customer data to the appropriate PE 14 by pushing the appropriate trunk label onto the customer data to route the packet to the destination provider edge device 14. These procedures are well defined for MPLS label switch routers ("LSRs") as specified in RFC 3031, and it is possible to envision other specific embodiments of provider tandem's 18 MPLS functions. Use of Penultimate Hop Popping may be employed at both the trunk level such that the tandem has no requirement to explicitly pop the trunk label (the operation performed by the network element upstream of it). Provider tandem 18 may also be configured to offer additional labels to its BGP peers to impose additional hierarchy in the forwarding operations and condense the requisite cross-connect table size. There are other embodiments that are a consequence of the richness of functionality specified in MPLS. Suffice it to say that any hierarchical combination of trunk and service labeling that can appropriately transit a provider tandem 18 is sufficient to realize this invention.

Once the trunk is created or of the trunk already exists, provider edge device 14 checks to insure that there sufficient CIR available on the trunk to provider tandem 18 (step S108). If sufficient CIR is not available, the trunk is modified. If modification is not possible due to bandwidth constraints, the network operations center ("NOC") is notified (step S110). Advantageously, because the determination as to whether or not there is sufficient bandwidth and/or CIR available to accommodate the additional CIR to the provider tandem 18 serving as the hub is made at the time the customer edge device 12 is added to system 10, the NOC can be notified in an advance and deterministic manner that additional resources are necessary or that the trunk needs to be provisioned to support the additional CIR, thereby avoiding a need for extensive modeling and reactive activities such as tweaking network routing metrics, etc. to support the new site. Optionally, in the case where multiple redundant provider tandem devices 18 are employed to support a customer as is contemplated by the present invention, the provisioning team for the service provider may wish to provision the trunk to the redundant provider tandem 18 only until the trunk to the other provider tandem 18 can be provisioned, upgraded, etc.

Once the various aspects of adding the new site have been provisioned as described above with respect to steps S100 to S110, provider edge device 14 polices and marks incoming traffic received from its locally attached customer edge device 14 to CIR so that a determination can be made at the virtual private network service provider portion entry point as to whether the customer data is within the committed rate or whether the traffic must be tagged as burst mode traffic (step S112).

Once the trunk is created or if the trunk already exists, provider edge device 14 checks to insure that there is sufficient CIR available on the trunk to provider tandem 18 (step S108). If sufficient CIR is not available, the trunk is modified. If modification is not possible due to bandwidth constraints, the network operations center ("NOC") is notified (step S110). Advantageously, because the determination as to whether or not there is sufficient bandwidth and/or CIR available to accommodate the additional CIR to the provider tandem 18 serving as the hub is made at the time the customer edge device 12 is added to system 10, the NOC can be notified in an advance and deterministic manner that additional resources are necessary or that the trunk needs to be provisioned to support the additional CIR, thereby avoiding a need for extensive modeling and reactive activities such as tweaking network routing metrics, etc. to support the new site. Optionally, in the case where multiple redundant provider tandem devices 18 are employed to support a customer as is contemplated by the present invention, the provisioning team for the service provider may wish to provision the trunk to the redundant provider tandem 18 only until the trunk to the other provider tandem 18 can be provisioned, upgraded, etc.

Provider tandem device 18 maps its own label to the provider edge device 14 service label and offers its own label and route to all spoke provider edge devices 14 via the BGP route reflector 24 or other suitable mechanism for route propagation such as the full mesh of BGP adjacencies described above (step S118). By creating its own label and routing the information with the new label to all spoke provider edge devices 14, provider tandem 18 essentially creates a multipoint label so that all customer data destined for the customer edge device 12 supporting the new customer route is transmitted by the spokes to provider tandem 18.

As is noted above, it is contemplated that the present invention can be implemented with more than one provider tandem 18 serving as the hub for a virtual private network for an individual client. This is the case because, the provider tandem function can be implemented as part of an MPLS switch and therefore put where it is needed. Based on the above description, it should be apparent to those of ordinary skill in the art that two devices acting as hubs to the local set of hosts and acting in the role of spokes to each other will automatically build a redundant infrastructure and that provider edge devices 14 acting as spokes would see two trunks and corresponding sets of service labels so that load sharing can be accomplished across the trunks. Provider edge device 14 merely needs to recognize the plurality of trunks for a given service instance and may use any of several well known methods for spreading load between them.

The present invention advantageously provides a mechanism by which CIR information can be distributed throughout the network and easily monitored, thereby facilitating deterministic network engineering and the creation of reliable virtual private networks which do not require constant tuning and tweaking by the service provider. The deterministic nature of networks built in accordance with the present invention addresses the "slosh" situation because the virtual private network is established based on the CIR at the time of implementation and does not require over-engineering or adversely cause or impact under-engineering, and the impact of changes in customer load patterns is constrained to the artificially constrained customer topology. In addition, because the provider tandem device 18 offers its own label which maps to a provider edge device 14 service label, the process of moves, adds and changes is decoupled from service provider operations, thereby minimizing the impact of individual virtual private network operational behavior on the service provider network as a whole.

The method and system described above can be implemented be to compatible with existing private network implantations such as those based on RFC 2547. Because a provider tandem 18 can be added to an existing network and configured to simple accept all routing advertisements from provider edge devices 14 and reflect them back out as modified advertisements, existing networks can seamlessly be migrated/upgraded to implement the present invention, including but not limited to those based on RFC 2547.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system having a central processing unit and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computer system is able to carry out these methods. Storage medium refers to any volatile or non-volatile storage device.

Although the present invention is described with reference to an exemplary transport network and topology, it is contemplated that the present invention can also be implemented over any of several styles of transport networks that support either packet or circuit connections with the appropriate attributes. Such styles would include but not be limited to MPLS, Asynchronous Transfer Mode ("ATM"), Automatically Switched Optical Networks ("ASON"), Virtual Concatenation+Link Capacity Adjustment Scheme ("VCAT+LCAS"), etc.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for providing a virtual private communication network to transport customer data between a set of customer devices coupled to an Internet Protocol (IP) provider network, the method comprising:
   advertising a committed information rate to a provider tandem of the virtual private communication network;
   determining, at the provider tandem, whether sufficient network resources exist to successfully transport to a destination customer device all offered data from the set of customer devices at the advertised committed information rate; and
   adding a customer site to the virtual private network using a process comprising:
      linking the added customer device to a provider edge device;
      provisioning the virtual private network to:
         identify the added customer device as a device within the virtual private network;
         establish a committed information rate for communication between the added customer device and the provider tandem;
      creating a trunk from the provider edge device to the provider tandem; and
      determining if there is sufficient committed information rate resources available on the trunk to support the established committed information rate.

2. The method according to claim 1, wherein the committed information rate advertisements are included as part of a routing update including routes supported by the respective customer devices.

3. The method according to claim 2, wherein the committed information rate advertisements are included as part of a border gateway protocol routing update.

4. The method according to claim 2, further comprising marking the customer data to indicate whether the customer data transmission is above a committed information rate along a data path from an originating customer device to a destination customer device, wherein the customer data is marked at the provider tandem if the customer data transmission is above a committed information rate.

5. The method according to claim 1, further comprising logically directly coupling the set of customer devices with the provider tandem to form a virtual hub and spoke network topology to route the customer data from an originating customer device to a destination customer device.

6. The method according to claim 1, further comprising transmitting committed information rate data to provider edge devices supporting the set of customer devices as part of a routing update by the provider tandem.

7. The method according to claim 1, further comprising adding a new route within the virtual private network, adding a new route comprising:
   providing the new route and a corresponding first service label to the provider tandem;
   mapping the first service label to a second service label, the second service label corresponding to the provider tandem; and
   providing the second service label and the route to customer edge devices within the virtual private network.

8. The method according to claim 1, wherein the customer data includes a destination address, the method further comprising:
   mapping the destination address to a path through the virtual private network; and
   reserving network resources to allow the customer data to be routed through the virtual private network.

9. The method according to claim 8, wherein mapping the destination address includes attaching a label switch path to the customer data to define a routing path through the virtual private network.

10. The method according to claim 9, further comprising mapping the label switch path to a communication link trunk using the routing update to obtain the information for populating the map.

11. The method according to claim 10, wherein the routing update used to populate the map is a border gateway protocol routing update.

12. A system for a virtual private communication network to transport customer data, the system comprising:
an Internet Protocol (IP) provider network;
a set of customer devices, communicatively coupled to the Internet Protocol (IP) provider network;
a set of provider edge devices within the virtual private communication network, each of the set of provider edge devices advertising a committed information rate for at least one of a corresponding customer device from the set of customer devices, and
a provider tandem in data communication with the set of provider edge devices, the provider tandem supporting the Internet Protocol (IP) network, the provider tandem determining whether sufficient network resources exist to successfully transport to a destination customer device all offered data from the set of customer devices within the advertised committed information rate;
each of the provider edge devices being further operable to:
identify a customer device as a device within the virtual private network;
establish a committed information rate for communication between the provider edge device and the provider tandem,
wherein a trunk is created from the provider edge device to the provider tandem.

13. The system according to claim 12, wherein the committed information rate advertisements are included as part of a routing update including routes supported by the respective customer devices.

14. The system according to claim 13, wherein the committed information rate advertisements are included as part of a border gateway protocol routing update.

15. The system according to claim 12, wherein the set of customer devices are logically directly coupled to the provider tandem to form a virtual hub and spoke network topology to route the customer data from an originating customer device to a destination customer device.

16. The system according to claim 12, wherein the provider tandem transmits committed information rate data to provider edge devices supporting the set of customer devices as part of a routing update.

17. The system according to claim 12, wherein the provider edge devices are further configured to provide a route and a corresponding first service label to the provider tandem, the provider tandem:
mapping the first service label to a second service label, the second service label corresponding to the provider tandem; and
providing the second service label and the route to customer edge routers within the virtual private network.

18. The system according to claim 12, wherein the customer data includes a destination address and wherein the provider edge device includes a classifier, the classifier operating to map the destination address to a path through the virtual private network, wherein network resources are reserved based on the map to allow the customer data to be routed through the virtual private network.

19. The system according to claim 18, wherein the classifier maps the destination address in a manner which includes attaching a label switch path to the customer data to define a routing path through the virtual private network.

20. The system according to claim 19, wherein the provider tandem maps the label switch path to a communication link trunk using the routing update to obtain the information for populating the map.

21. The system according to claim 20, wherein the routing update used to populate the map is a border gateway protocol routing update.

* * * * *